(12) United States Patent
Harada

(10) Patent No.: US 6,906,752 B1
(45) Date of Patent: Jun. 14, 2005

(54) FLUCTUATION DETECTING APPARATUS AND APPARATUS WITH FLUCTUATION DETECTING FUNCTION

(75) Inventor: Yasuhiro Harada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 815 days.

(21) Appl. No.: 09/717,276

(22) Filed: Nov. 22, 2000

(30) Foreign Application Priority Data

Nov. 25, 1999 (JP) .......................................... 11-333728

(51) Int. Cl.[7] ........................ H04N 5/232; H04N 5/228; G03B 13/00
(52) U.S. Cl. .................. 348/352; 348/345; 348/208.99
(58) Field of Search .............................. 348/345, 346, 348/348, 349, 350, 352, 353–356, 208.99, 208.2, 208.3, 208.7, 208.5; 396/89, 95, 55, 52, 147, 121, 122, 123, 287, 45

(56) References Cited

U.S. PATENT DOCUMENTS

| | | | |
|---|---|---|---|
| 4,527,053 A | 7/1985 | Kinoshita et al. | 250/201 |
| 5,053,801 A * | 10/1991 | Ishida et al. | 396/79 |
| 5,089,842 A * | 2/1992 | Uchiyama et al. | 396/96 |
| 5,138,360 A * | 8/1992 | Yamasaki | 396/104 |
| 5,262,820 A | 11/1993 | Tamai et al. | 354/402 |
| 5,561,497 A * | 10/1996 | Muramatsu et al. | 396/121 |
| 6,285,831 B1 * | 9/2001 | Hara | 396/50 |
| 6,344,876 B2 * | 2/2002 | Shiomi | 348/208.1 |

FOREIGN PATENT DOCUMENTS

| | | |
|---|---|---|
| JP | 58-4109 | 1/1983 |
| JP | 4-349439 | 12/1992 |
| JP | 5-10603 | 1/1993 |

\* cited by examiner

*Primary Examiner*—Aung Moe
(74) *Attorney, Agent, or Firm*—Fitzpatrick, Cella, Harper & Scinto (57) ABSTRACT

A fluctuation detecting apparatus includes a light receiving portion for detecting an image signal for an object in each of a plurality of areas, a judging circuit for judging from the image signal obtained in each of the areas whether an object located at a long distance is mixed with an object located at a short distance, and a fluctuation amount calculating circuit for independently finding fluctuation data by the use of the image signal of the area in which the object located at a short distance exists and the image signal of the area in which the object located at a long distance exists when the judging circuit judges that the object located at a long distance is mixed with the object located at a short distance, and calculating a rotational fluctuation amount and a shift fluctuation amount on the basis of the fluctuation data.

20 Claims, 6 Drawing Sheets

FLUCTUATION DETECTING APPARATUS AND APPARATUS WITH FLUCTUATION DETECTING FUNCTION

BACKGROUND OF THE INVENTION

1. Field of the Invention

This invention relates to a fluctuation detecting apparatus having the function of calculating a signal corresponding a distance and fluctuation data, and an apparatus with the fluctuation detecting function.

2. Related Background Art

There have heretofore been proposed cameras which effect fluctuation detection by the utilization of automatic focus detecting apparatuses as shown in Japanese Patent Application Laid-Open No. 58-4109 and Japanese Patent Publication No. 5-10603. These cameras effect fluctuation detection by the use of an image pickup element (hereinafter referred to as the AF sensor) the automatic focus detecting apparatus has, and use correlative calculation for image data at a certain time and image data after the lapse of a predetermined time to thereby find the fluctuation amount of the camera.

On the other hand, in recent years, there has been proposed a camera capable of effecting multipoint distance measurement which can measure the object distance in a plurality of areas in a photo-taking image field. Cameras carrying the above-described fluctuation detecting function on such a camera capable of effecting multipoint distance measurement have also been proposed in Japanese Patent Application Laid-Open No. 4-349439, etc. In these cameras capable of effecting multipoint distance measurement and moreover effecting fluctuation detection by the use of the AF sensor, fluctuation detection is effected on the basis of the image data of the AF sensor corresponding to each area (distance measuring point) on which the distance of a main object is measured. Accordingly, fluctuation correction is effected by the use of this fluctuation data, whereby accurate fluctuation correction becomes possible for the main object.

In the fluctuation detection utilizing the above-described conventional AF sensor, the fluctuation of the camera is detected as the image fluctuation amount on the surface of the AF sensor and therefore, whether the detected fluctuation component of the camera is due to the shift fluctuation of the camera in translation directions X and Y or due to the rotation fluctuation in pitch direction P and yaw direction Y cannot be distinguished. Accordingly, when fluctuation correction is to be effected on the basis of the detected fluctuation amount, a fluctuation amount comprising sum of a shift fluctuation component and a rotational fluctuation component is corrected without fail. The rotation fluctuation component is constant in its influence upon the image fluctuation on the surface of the sensor irrespective of the distance of the object, whereas the influence of the shift fluctuation component is varied in the influence on the surface of the sensor by the distance of the object and therefore, when objects differing in distance existed in the photo-taking image field, if detection was effected without the shift fluctuation component and the rotational fluctuation component being separated from each other and fluctuation correction was effected on the basis of that fluctuation amount, accurate correction could not be effected for the objects differing in distance.

SUMMARY OF THE INVENTION

One aspect of this invention is to detect an image signal for an object in each of a plurality of areas, and judge from this image signal whether an object located at a long distance is mixed with an object located at a short distance, and to provide a fluctuation detecting apparatus having a fluctuation amount calculating circuit for obtaining, if an object located at a long distance is mixed with an object located at a short distance, fluctuation data from each of the image signal of an area in which the object located at a short distance exists and the image signal of an area in which the object located at a long distance exists, and calculating a rotational fluctuation amount and a shift fluctuation amount on the basis of these fluctuation data.

One aspect of this invention is to detect an image signal for an object in each of a plurality of areas, and judge from this image signal whether an object located at a long distance is mixed with an object located at a short distance, and to provide an apparatus with the fluctuation detecting function having a fluctuation correction device for obtaining, if an object located at a long distance is mixed with an object located at a short distance, fluctuation data from each of the image signal of an area in which the object located at a short distance exists and the image signal of an area in which the object located at a long distance exists, calculating a rotational fluctuation amount and a shift fluctuation amount on the basis of these fluctuation data, and corresponding to each of the rotational fluctuation amount and the shift fluctuation amount.

DESCRIPTION OF THE PREFERRED EMBODIMENTS

The present invention will hereinafter be described in detail with respect to an embodiment thereof shown in the drawings.

Figure 1:
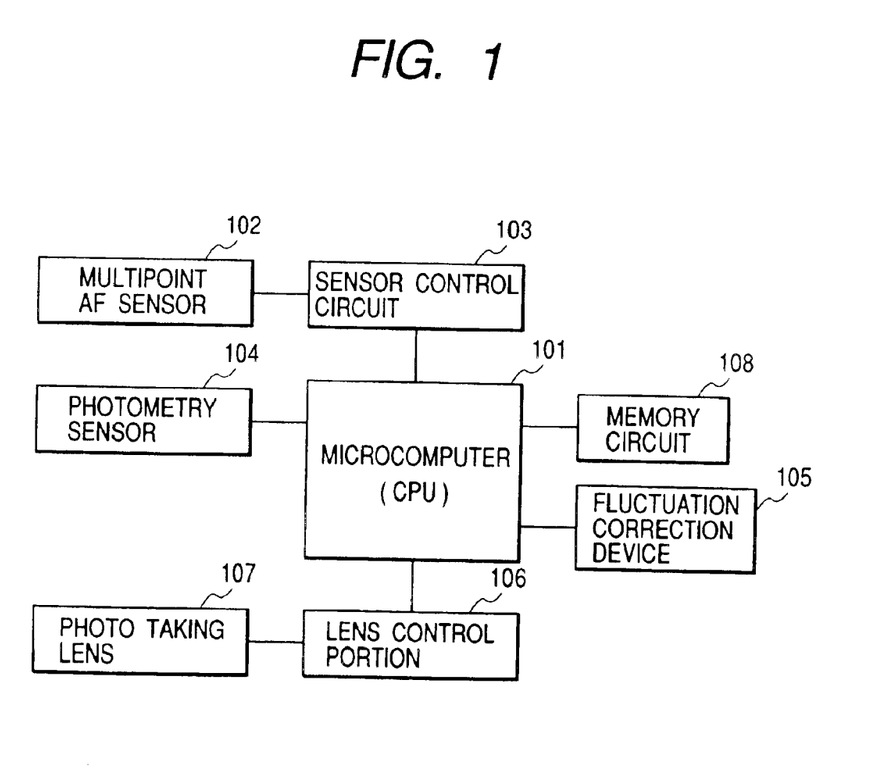
FIG. 1 is a block diagram showing the circuit construction of the essential portions of a camera according to an embodiment of the present invention.

FIG. 1 is a block diagram showing the circuit construction of the essential portions of a camera as an optical apparatus according to an embodiment of the present invention.

In FIG. 1, the reference numeral 101 designates a microcomputer (hereinafter referred to as the CPU) which executes the sequence control of the entire camera including lens driving and exposure, and also executes exposure calculation and distance measuring calculation and further, calculation regarding photographing such as calculation concerned with fluctuation detection. The reference numeral 102 denotes a multipoint AF sensor (specifically a line sensor) disposed crosswise in horizontal and vertical directions to measure the object distance (absolute distance) in a plurality of areas in a photo-taking images field. The reference numeral 103 designates a sensor control circuit which outputs a signal conforming to the object distance to the CPU 101 on the basis of the result of the detection (measured distance data) by the AF sensor 102, and in this embodiment, fluctuation detection is effected by the use of the output from the AF sensor 102 and therefore, the sensor control circuit 103 also outputs data for fluctuation detection. The reference numeral 104 denotes a photometry sensor which measures the luminance of outdoor daylight during photographing, and effects photometry in conformity with the control signal from the CPU 101.

The reference numeral 105 designates a fluctuation correction device having correction devices for independently correcting a shift fluctuation component and a rotational fluctuation component. Describing the fluctuation correction device in detail with reference to FIG. 2, the correction device for the rotation fluctuation component drives a lens A for correction provided in a portion of a photo-taking lens system so as to negate image fluctuation in a direction orthogonal to the optical axis thereof, on the basis of a detected fluctuation amount, to thereby effect correction. In other words, it is a device for correcting rotation fluctuation by changing the angle of incidence of a photo-taking beam incident on a light receiving surface corresponding to a film surface. On the other hand, the correction device for the shift fluctuation component drives a movable portion B provided on the grip portion of a camera in the horizontal and vertical directions of the camera on the basis of the detected fluctuation amount and drives the camera in the direction of translation to thereby effect correction. In other words, it is a device for correcting shift fluctuation by moving the light receiving surface and the photo-taking lens as a unit in the direction of translation.

The reference numeral 106 denotes a lens control portion which effects the control of the ordinary lens operation such as the driving of a photo-taking lens 107, and the reference numeral 108 designates a memory circuit storing therein necessary data such as the aforementioned measured distance data and data for image fluctuation correction.

Figure 3:
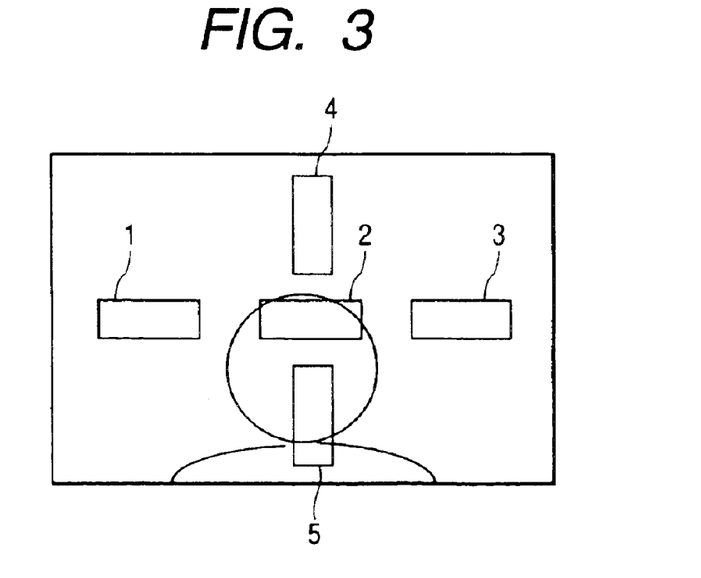
FIG. 3 shows areas for obtaining measured distance data and fluctuation data in a photo-taking image field in the camera of FIG. 1.

FIG. 3 shows areas for measuring the object distance in the photo-taking image field by the AF sensor 102.

In the present embodiment, the camera has five areas, and measured distance data is found in each area. Further, fluctuation detection is effected by the use of the outputs from these areas.

The fluctuation in the horizontal direction is detected by the use of the areas 1, 2 and 3, and the fluctuation in the vertical direction is detected by the use of the outputs of the areas 4 and 5. In this embodiment, the number of the areas for obtaining the measured distance data (for measuring the object distance) is five, but if it is possible to obtain the measured distance data by a plurality of areas, the number of the areas need not be limited to five.

Description will now be made of the fluctuation detecting operation of the camera in the above-described construction.

Figure 4:
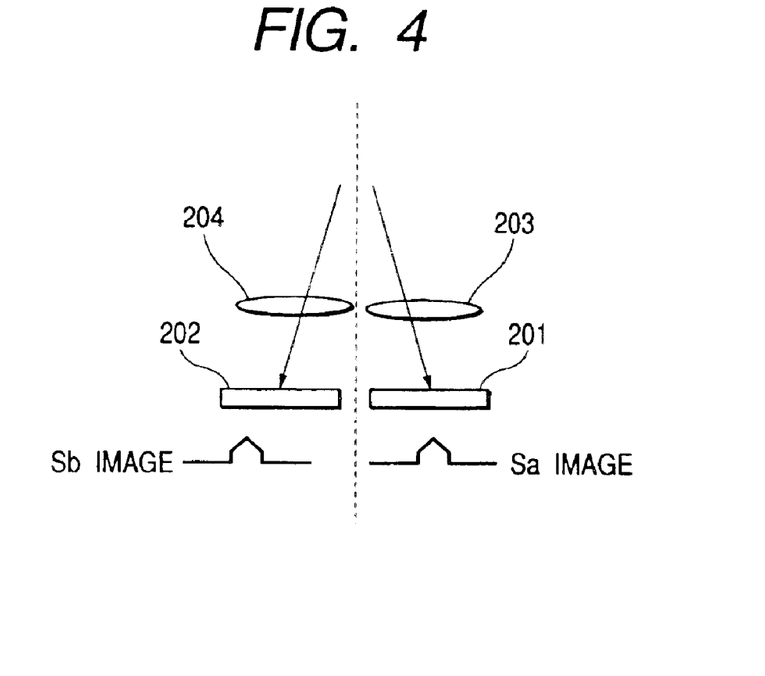
FIG. 4 shows the basic principle in the distance measurement of the camera of FIG. 1.

The fluctuation detection in the present embodiment is one in which a distance measuring system of the so-called phase difference detection type is arranged for the fluctuation detection of the camera, and FIG. 4 shows the basic principle of the distance measurement by the phase difference detection type.

Figure 5:
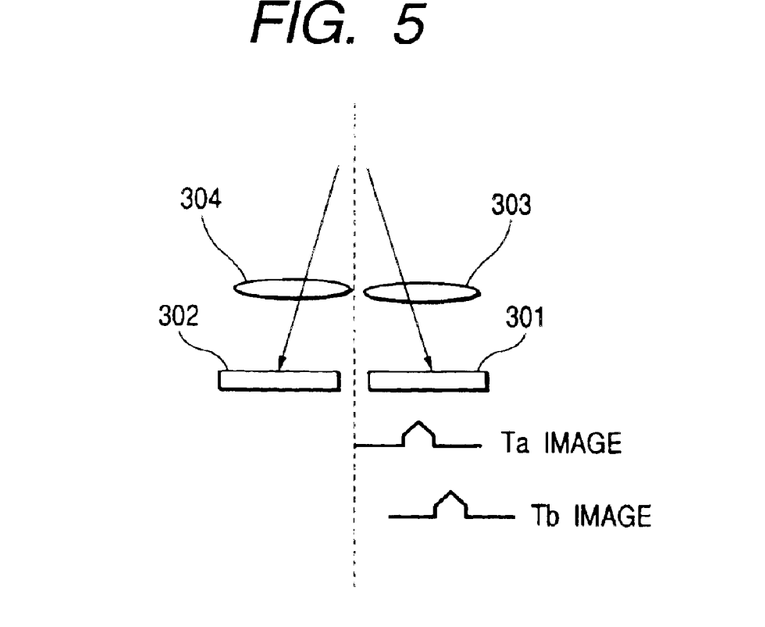
FIG. 5 shows the basic principle when in the camera of FIG. 1, fluctuation detection is effected by the utilization of an AF sensor.

Incident light passed through a light receiving lens passes through separator lenses 203 and 204 and is imaged on line sensors 201 and 202 (corresponding to the AF sensor 102) disposed at spatially different positions. The phases of two image signals Sa and Sb imaged on these line sensors 201 and 202 are deviated from each other and the difference therebetween is compared, as it were, correlative calculation is effected to thereby detect the image deviation amount between the two images, and calculate the measured distance data. Further, in this embodiment, the line sensor (AF sensor 102) is used for fluctuation detection at the interval between the distance measuring operations. That is, describing with reference to FIG. 5, the image of the object is picked up at different times by one side 301 of the line sensor and correlative calculation is effected on the basis of two obtained image data Ta and Tb, whereby the detection of the amount of deviation in terms of time, i.e., the fluctuation amount by the fluctuation of the camera, is effected. Various propositions have been made regarding this basic principle, and in the present embodiment as well, the image fluctuation amount is detected by a similar principle and therefore, the details thereof need not be described.

Figure 6:
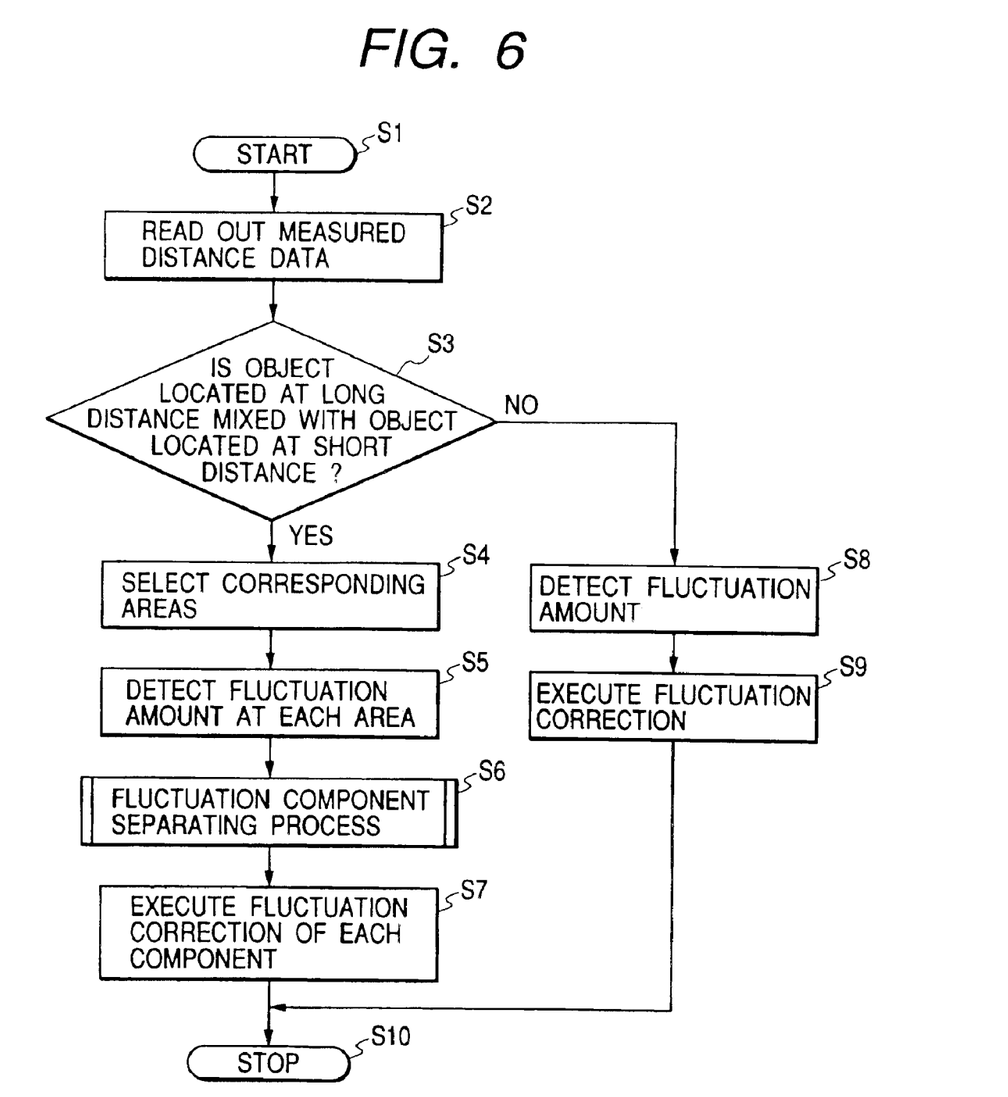
FIG. 6 is a flow chart showing the operation of that portion of the camera of FIG. 1 which is concerned in fluctuation detection.

The fluctuation component separating process operation started after the half depression of a release button, not shown, i.e., the operation concerned with the fluctuation detection and fluctuation correction of the camera which are the main portions in the present embodiment, will now be described with reference to the flow chart of FIG. 6.

At a step S1, the operation of detecting the fluctuation of the camera is started, and at a step S2, measured distance data corresponding to the areas 1 to 5 obtained by the multipoint AF sensor 102 are read from the memory circuit 108. At the next step S3, on the basis of the measured distance data of the respective areas read at the step S2, whether an object located at a long distance is mixed with an object located at a short distance in the photo-taking image field is judged.

This judgement is executed by storing the threshold value data N of the short distance and the threshold value data F of the long distance in advance in the memory circuit 108, and comparing the threshold value data N and F with the respective measured distance data. Specifically, comparison is effected with the measured distance data in the horizontal direction (areas 1, 2 and 3) and the vertical direction (areas 4 and 5), and when the measured distance data are N or less, the object is judged to be an object located at a short distance, and as an object located at a short distance, the information of the areas is stored in the memory circuit 108. When the measured distance data are F or greater, the object is judged to be an object located at a long distance, and as an object located at a long distance, the information of the areas is stored in the memory circuit 108. After in this manner, comparison has been effected with all the measured distance data, whether at least one set of an object in the areas from which short distance information has been obtained and an object in the areas from which long distance information has been obtained exist in each of the horizontal and vertical directions is judged. Here, the threshold values need not be fixed values, but may be variable on the basis of the focal length information, etc. of the lens. Also, the threshold values are classified into N used for the judgement of the short distance and F used for the judgement of the long distance, but the same values may be set as the threshold values.

If at the step S3, it is judged that an object located at a long distance is not mixed with an object located at a short distance, advance is made to a step S8, where the separation of the fluctuation components is not effected but the detection of the fluctuation amount is effected. This fluctuation detecting operation is such as described with reference to FIG. 5. Next, advance is made to a step S9, where the driving amount of the fluctuation correction device 105, is found on the basis of the fluctuation amount information detected at the step S8 and the focal length information, and this fluctuation correction device is driven to effect fluctuation correction. For this fluctuation correction, only one of the rotational fluctuation correction device and the shift fluctuation correction device is used. Thereafter, advance is made to a step S10, a series of fluctuation detecting and fluctuation correcting operation are terminated.

If at the step S3, it is judged that an object located at a long distance is mixed with an object located at a short distance, advance is made to a step S4, where a set of areas corresponding to the objects located at a short distance and a long distance are selected in each of the horizontal and vertical directions by the information stored in the memory circuit 108 at the step S3. If there are a plurality of areas corresponding to the objects located at a short distance and a long distance, the area at the nearest side and the area at the farthest side are selected. At the next step S5, fluctuation detection is effected for each area by the use of image data corresponding to each area selected at the step S4. At the next step S6, the separating process is carried out by the use of the fluctuation amount for the objects located at a long distance and a short distance obtained at the step S5, and the separation of the shift fluctuation component in the horizontal and vertical directions and the rotational fluctuation component in the pitch and yaw directions is effected.

The above-described fluctuation component separating process utilizes the fact that the influences given onto the surface of the sensor by the shift fluctuation component and the rotational fluctuation component differ from each other. Specifically described, attention is paid to the point that the rotational fluctuation component gives a constant influence irrespective of the object distance, whereas the influence of the shift fluctuation component is great for an object located at a short distance and is very little for an object located at a long distance. That is, the image fluctuation amount of the object located at a short distance can be regarded as including the rotational fluctuation component and the shift fluctuation component, and the image fluctuation amount of the object located at a long distance can be regarded as including only the rotational fluctuation component and therefore, by taking the difference between the image fluctuation amounts of the objects located at a short distance and a long distance, the shift fluctuation component is found, and consequently the separation of the shift fluctuation component and the rotational fluctuation component is realized.

Figure 7:
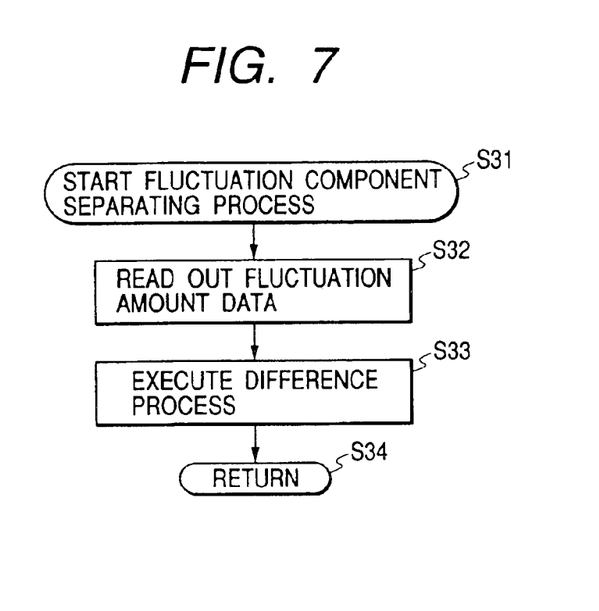
FIG. 7 is a flow chart showing the operation of that portion of the camera of FIG. 1 which is concerned in the fluctuation component separating process.

The subroutine of the fluctuation component separating process executed at this step S6 will now be described with reference to the flow chart of FIG. 7.

Figure 8:
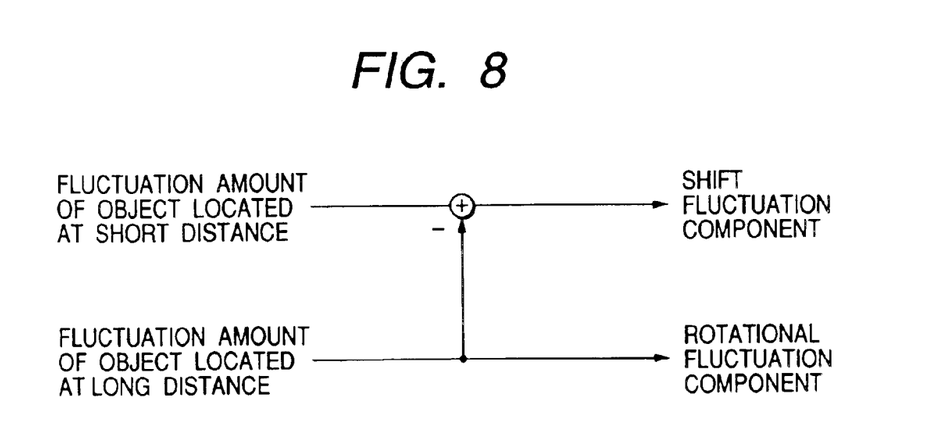
FIG. 8 shows the construction of a circuit for effecting the fluctuation component separating process which is provided in the camera of FIG. 1.
Figure 9:
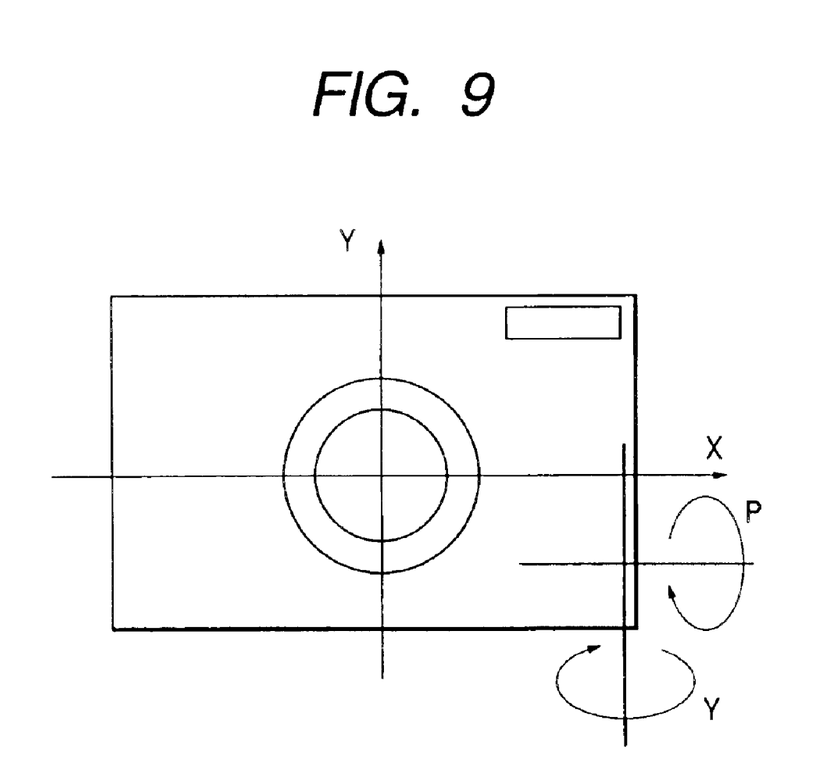
FIG. 9 shows the fluctuation components of the camera of FIG. 1.

At a step S31, the fluctuation component separating process is started, and at a step S32, the fluctuation amounts (fluctuation data) of the objects located at a short distance and a long distance are read out from the memory circuit 108. At the next step S33, difference processing is carried out for the fluctuation amounts of the object located at a short distance and the object located at a long distance, and the separation of the shift fluctuation component and the rotational fluctuation component is effected. FIG. 8 shows a processing circuit therefor. At a step S34, the fluctuation component separating process is terminated, and advance is made to the step S7 of the main routine.

Turning back to FIG. 6, at the step S7, the driving amount of the fluctuation correction device 105 is found on the basis of the fluctuation amount of each component obtained at the step S6, and the correction device (see FIG. 2) for the correction of the shift fluctuation component and the rotational fluctuation component are driven to thereby effect fluctuation correction. At a step S10, a series of fluctuation detecting and correcting operations are terminated.

What has been described above is the operation concerned in the fluctuation detections and fluctuation correction according to the embodiment of the present invention.

According to the above-described embodiment, attention is paid to the fact that the image fluctuation amount detected from the image data obtained for the object located at a short distance contains the rotational fluctuation component and the shift fluctuation component, whereas the image fluctuation amount detected from the image data obtained for the object located at a long distance includes only the rotational fluctuation component, and design is made such that the separation of the fluctuation components is effected by taking the difference between the image fluctuation amounts of the object located at a short distance and the object located at a long distance.

Specifically, design is made such that for example, whether an object located at a long distance is mixed with an object located at a short distance in the photo-taking image field is judged from the measured distance data of the five areas, and if it is judged that the former object is mixed with the latter object, the areas corresponding to the objects located at a short distance and a long distance are selected, and fluctuation data is found from the image data in the selected areas, and the shift fluctuation and rotational fluctuation components are separated from each other by the use of this fluctuation data and therefore, when fluctuation detection is to be effected by the use of the AF sensor, it becomes possible to separate and detect the shift fluctuation component in the direction of translation and the rotational fluctuation component in the rotational direction.

Figure 2:
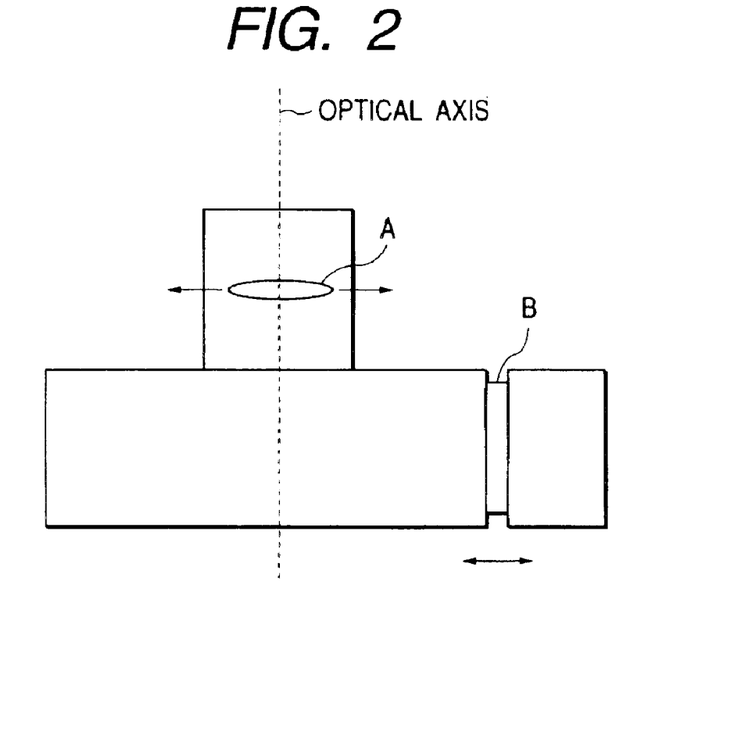
FIG. 2 shows each correction device provided in the camera of FIG. 1.

Also, as shown in FIG. 2, the apparatus of the present invention has the correction device for independently correcting the shift fluctuation component and the rotational fluctuation component and therefore, the shift fluctuation component and the rotational fluctuation component can be separately detected so that accurate correction can be effected on the basis of each of the detected fluctuation components.

While in the above-described embodiment, fluctuation data is obtained by the use of the AF sensor for obtaining measured distance data, this is not restrictive, but a light receiving sensor for exclusive use may be had.

Also, while in the above-described embodiment, a line sensor disposed crosswise is shown as the multipoint AF sensor, a two-dimensional area sensor such as a CCD may also be used.

Also, there has been shown an example in which the fluctuation component separating process is not carried out when the objects at a short distance and a long distance are mixed with each other in neither of the horizontal and vertical directions, but when the two objects are mixed with each other for only one of the two directions, the fluctuation component separating process may be carried out only for that direction.

Also, while there has been shown an example in which when there exist a plurality of areas located at a short distance and a long distance, the areas at the nearest side and the farthest side are selected, the selection of the areas may be effected with such information as the contrast of the image data also added.

Further, while there has been shown an example in which a correction device is independently provided for each fluctuation component and correction is accurately effected for both of the two fluctuation components, a fluctuation component selecting member such as a switch for selecting the fluctuation components (or a member for selecting the correction devices) may be provided so that the fluctuation component to be corrected can be selected. Thereby, it becomes possible to make such design that during the composition changing operation, e.g. the panning operation, of the camera, the detection of the fluctuation component in that direction is not selected, whereby the panning operation can be performed smoothly (because it does not happen that the correction device detects the panning operation as a fluctuation and acts so as to correct it).

As described above, according to the above described embodiment, there can be provided an apparatus with the fluctuation detecting function which, can obtain the rotational fluctuation amount and the shift fluctuation amount by the image signal and even when an object located at a long distance is mixed with an object located at a short distance and there exist both of the rotational fluctuation component and the shift fluctuation component, can effect accurate fluctuation correction for each of the object located at a short distance and the object located at a long distance.

Also, there can be provided an apparatus with the fluctuation detecting function which can correct the fluctuation components without spoiling the operability for the movement of the apparatus in an intended direction, and can effect accurate fluctuation correction for both of the object located at a short distance and the object located at a long distance.

While in the above-described embodiment, there has been shown an example in which the optical apparatus is a camera, a digital camera, a video camera and a compound apparatus of these are also included as the optical apparatus.

Further, any other apparatus having the fluctuation correcting and detecting functions than the above-mentioned optical apparatuses are also included.

What is claimed is:

1. A fluctuation detecting apparatus comprising:
   a light receiving portion which detects an image signal for an object in each of a plurality of areas;
   a judging circuit for judging from the image signal obtained in each of said areas whether an object located at a long distance is mixed with an object located at a short distance; and
   a fluctuation amount calculating circuit which switches over in accordance with a judging result of said judging circuit, between a case in which a rotational fluctuation amount and a shift fluctuation amount are calculated from the image signals obtained by said light receiving portion and a case in which the rotational fluctuation amount and the shift fluctuation amount are not calculated.

2. A fluctuation detecting apparatus according to claim 1, further comprising:
   a distance calculating circuit which calculates the distance to the object in each of said areas from the image signal obtained in each of said areas, wherein said judging circuit for judges from the distance to the object in each of said areas whether the object located at said long distance is mixed with the object located at said short distance.

3. A fluctuation detecting apparatus according to claim 1, wherein said judging circuit compares the distance to the objects obtained from the image signal of each area calculated by said distance calculating circuit with a threshold value to thereby detect the object located at said short distance and the object located at said long distance.

4. A fluctuation detecting apparatus comprising:
   a light receiving portion which detects an image signal for an object in each of a plurality of areas;
   a distance calculating circuit which calculates the distance to the object in each of said areas from the image signal obtained in each of said areas; and
   a fluctuation amount calculating circuit which separates the rotational fluctuation amount and the shift fluctuation amount from the difference between the fluctuation data obtained from the image signal of the area in which an object is located at a short distance and the fluctuation data obtained from the image signal of the area in which an object is located at a long distance.

5. A fluctuation detecting apparatus according to claim 4, wherein said fluctuation amount calculating circuit makes the difference between the fluctuation data obtained from the image signal of said object located at said short distance and the fluctuation data obtained from the image signal of said object located at said long distance into the shift fluctuation amount.

6. A fluctuation detecting apparatus according to claim 4, wherein said fluctuation amount calculating circuit selects the nearest object when a plurality of objects at said short distance are detected by said judging circuit, and selects the farthest object when a plurality of objects located at said long distance are detected, and calculates the fluctuation amount.

7. A fluctuation detecting apparatus according to claim 4, wherein said light receiving portion is a line sensor.

8. A fluctuation detecting apparatus according to claim 4, wherein said light receiving portion is a two-dimensional area sensor.

9. An apparatus with the fluctuation detecting function comprising:
   a light receiving portion for detecting an image signal for an object in each of a plurality of areas;
   a distance calculating circuit which calculates the distance to the object in each of said areas from the image signal obtained in each of said areas;
   a fluctuation amount calculating circuit which separates the rotational fluctuation amount and the shift fluctuation amount from the difference between the fluctuation data obtained from the image signal of the area in which an object is located at a short distance and the fluctuation data obtained from the image signal of the area in which an object is located at a long distance;
   a first correction device for correcting rotational fluctuation on the basis of the rotational fluctuation amount calculated by said fluctuation amount calculating circuit; and
   a second correction device for correcting shift fluctuation on the basis of the shift fluctuation amount calculated by said fluctuation calculating circuit.

10. An apparatus with the fluctuation detecting function according to claim 9, further comprising a judging circuit for judging from the image signal obtained in each of said areas whether an object located at a long distance is mixed with an object located at a short distance, wherein when said judging circuit judges that the object located at a long distance is not mixed with the object located at a short distance, one of said first correction device and said second correction device is driven.

11. An apparatus with the fluctuation detecting function according to claim 9, wherein said first correction device corrects the rotational fluctuation by changing the angle of incidence of a beam incident on a light receiving surface, and said second correction device corrects the shift fluctuation by moving the light receiving surface and an optical system as a unit.

12. An apparatus with the fluctuation detecting function according to claim 9, which is a camera.

13. A fluctuation detecting apparatus comprising:

a fluctuation amount calculating circuit for detecting a fluctuation state and obtaining a fluctuation state signal for each of an object located nearer than a first predetermined distance and an object located farther than a second predetermined distance, and calculating a rotational fluctuation amount and a shift fluctuation amount from the fluctuation state signal obtained for each object, wherein said calculating circuit calculates said shift fluctuation amount from the difference between the fluctuation state signal detected for the object located nearer than said first predetermined distance and the fluctuation state signal detected for the object located farther than said second predetermined distance.

14. A fluctuation detecting apparatus according to claim 13, wherein a rotational fluctuation amount is calculated from the fluctuation state signal detected for the object located farther than said second predetermined distance.

15. A fluctuation detecting apparatus according to claim 13, further comprising:

a light receiving portion for receiving images from said objects; and wherein said fluctuation amount calculating circuit detects the fluctuation state on the basis of the difference between the positions of the images on said light receiving portion at a time interval between the images being received by said light receiving portion.

16. An apparatus with the fluctuation detecting function comprising:

a fluctuation amount calculating circuit for detecting a fluctuation state and obtaining a fluctuation state signal for each of an object located nearer than a first predetermined distance and an object located farther than a second predetermined amount and a shift fluctuation amount from the fluctuation state signal obtained for each object;

a first correction device for correcting the angle of incidence of a beam incident on a light receiving surface on the basis of the rotational fluctuation amount obtained by said fluctuation amount calculating circuit; and a second correction device for moving the light receiving surface and an optical system as a unit is the direction of translation on the basis of the shift fluctuation amount obtained by said fluctuation amount calculating circuit.

17. An apparatus with the fluctuation detecting function according to claim 16, wherein when said objects are single, one of said first and second correction devices is operated by the fluctuation state signal obtained for said object.

18. An apparatus with the fluctuation detecting function according to claim 16, wherein said first correction device corrects rotational fluctuation by changing the angle of incidence of the beam incident on the light receiving surface, and said second correction device corrects shift fluctuation by moving the light receiving surface and the optical system as a unit.

19. A fluctuation detecting method, comprising the steps of:

detecting an image signal for an object in each of a plurality of areas;

judging from the image signal obtained in each of said areas whether an object located at a long distance is mixed with an object located at a short distance; and switching over in accordance with a judging result of said judging step, between a case in which a rotational fluctuation amount and a shift fluctuation amount are calculated from the obtained image signals and a case in which the rotational fluctuation amount and the shift fluctuation amount are not calculated.

20. A fluctuation detecting method, comprising the steps of:

detecting an image signal for an object in each of a plurality of areas;

calculating the distance to the object in each of said areas from the image signal obtained in each of said areas; and separating the rotational fluctuation amount and the shift fluctuation amount from the difference between the fluctuation data obtained from the image signal of the area in which an object is located at a short distance and the fluctuation data obtained from the image signal of the area in which an object is located at a long distance.

* * * * *